United States Patent [19]
Ueda et al.

[11] Patent Number: 5,911,428
[45] Date of Patent: Jun. 15, 1999

[54] BICYCLE SUSPENSION FORK

[75] Inventors: Atsushi Ueda, Takatsuki; Minoru Abe, Katano; Naoki Tomiyama, Settsu, all of Japan

[73] Assignee: Exedy Corporation, Neyagawa, Japan

[21] Appl. No.: 08/798,687

[22] Filed: Feb. 12, 1997

[30] Foreign Application Priority Data

| Feb. 19, 1996 | [JP] | Japan | 8-030580 |
| Feb. 19, 1996 | [JP] | Japan | 8-030581 |
| Feb. 19, 1996 | [JP] | Japan | 8-030582 |
| Apr. 23, 1996 | [JP] | Japan | 8-101391 |
| Apr. 23, 1996 | [JP] | Japan | 8-101392 |
| Apr. 23, 1996 | [JP] | Japan | 8-101393 |

[51] Int. Cl.$^6$ ............................................. B62K 21/20
[52] U.S. Cl. ............................................. 280/276
[58] Field of Search ............................ 280/275, 276, 280/277, 283, 279, 280

[56] References Cited

U.S. PATENT DOCUMENTS

| 352,090 | 11/1886 | Humber | 280/276 |
| 353,904 | 12/1886 | Winey | 280/276 |
| 3,208,767 | 9/1965 | Moulton | 280/276 |
| 3,936,076 | 2/1976 | Probst | 280/276 |
| 4,881,750 | 11/1989 | Hartmann | 280/276 |
| 5,301,973 | 4/1994 | Truchinski | 280/276 |
| 5,308,099 | 5/1994 | Browning | 280/276 |
| 5,380,026 | 1/1995 | Robinson | 280/276 |
| 5,494,302 | 2/1996 | Farris et al. | 280/276 |

FOREIGN PATENT DOCUMENTS 211793  8/1993  Taiwan.

*Primary Examiner*—Kevin Hurley
*Attorney, Agent, or Firm*—Shinjyu An Intellectual Property Firm

[57] ABSTRACT

A suspension fork 10 for a bicycle is provided with a fork portion 40 for supporting a front wheel 12, a sleeve-like first fork stem 41, a sleeve-like second fork stem 42, a coil spring 43, an adjustment bolt 44, and a coupling portion 45. The first fork stem 41 is rotatably supported by a head portion 21, and the second fork stem 42 extends from the fork portion into an interior of the first fork stem 41. The coil spring 43 biases the first fork stem 41 and the second fork stem 42 away from each other. The coupling portion 45 includes a rotation preventing key 51 and an oblong slit 52 for coupling the first fork stem 41 and the second fork stem 42, and allows the first and second fork stems to be movable in an axial direction relative to each other but unrotatable relative to each other.

36 Claims, 11 Drawing Sheets

BICYCLE SUSPENSION FORK

BACKGROUND OF THE INVENTION

A. Field of the Invention

The present invention relates to suspension fork rotatably supported on a head portion of a bicycle frame, and to a bicycle on which the suspension fork is mounted.

B. Description of the Related Art

It is well known in the art to equip bicycles with a suspension fork instead of a rigid fork, for the purpose of absorbing shock generated during riding. Suspension forks for the front wheel of a bicycle are generally categorized as fork type, in which two suspension mechanisms replace parts of the fork legs, and head mounted type, in which a suspension is disposed between the handle post and the fork stem.

The suspension fork for the fork type is similar to one used in a motorcycle. However, since this involves two separate suspension mechanisms, the number of parts is increased, and there is an increase in weight and cost.

With respect to a head mounted suspension fork, it is possible to reduce the number of the parts as well as to reduce the weight and cost, since there is only one single suspension mechanism. The HEADSHOCK® (a product of Cannondale Corp.) is known as one type of head mounted suspension fork.

This type of suspension fork is provided with a fork portion for supporting a front wheel, a first fork stem integrally formed with a handle post and rotatably supported on a head portion, a second fork stem whose tip end is disposed in an interior of the first fork stem, a spring member for urging the two fork stems in a direction away from each other, and a coupling means composed of a needle bearing for securely coupling the first and second fork stems to be relatively movable in an axial direction but unrotatable relative to each other. Typically, the spring member is urethane rubber or a hydraulic cylinder. The needle bearing is interposed between an inner circumferential surface of a lower portion of the first fork stem and an outer circumferential surface of an upper portion of the second fork stem.

With this type of suspension fork, when a shock is applied to the front wheel, the second fork stem is guided by the needle bearing within the first fork stem and is moved upward against the spring force of the spring member to thereby absorb the shock. In addition, when the handle is manipulated, the first fork stem is rotated together with the handle and the second fork stem is rotated through the needle bearing. As a result, the front wheel is steered in a desired direction.

However, the coupling means is composed of a needle bearing, which is expensive. Accordingly, such a suspension fork is mounted only on an expensive mountain bike. In addition, the needle bearing is interposed between the first fork stem and the second fork stem, thus the outside diameter of the first fork stem must be larger than the standard diameter (25.4 mm) of the fork stem on regular rigid forked bicycles. This prevents this type of suspension from being used on a wide variety of bicycles.

SUMMARY OF THE INVENTION

It is therefore an object of the present invention to provide an inexpensive suspension fork that may be mounted on a regular bicycle while maintaining interchangeability with a rigid fork.

Another object of the present invention is to reduce the amount of noise generated in head mounted suspension forks during operation.

Yet another object of the present invention is to make it possible to readily adjust the elasticity of the head mounted suspension fork while riding the bicycle.

According to one embodiment of the present invention, a suspension fork rotatably supported on a head portion of a bicycle includes a fork portion for supporting a front wheel, a first fork stem rotatably supported by the head portion, a second fork stem extending from the fork portion into an interior of the first fork stem, a biasing means for biasing the first and second fork stem away from each other, a load adjustment means for adjusting an initial load of the biasing means, and a coupling means which includes a key and two key holes with which said key engages. The coupling means couples said first fork stem and said second fork stem together, and is configured to allow the first and second fork stem to be axially movable relative to each other but unrotatable relative to each other. The load adjusting means moves axially in response to its rotation.

The biasing means is a coil spring and is disposed within the first fork stem. A first end of the coil spring is in contact with the load adjustment means, and a second end of the coil spring is in contact with the second fork stem.

The key extends through the second fork stem, and both ends of the key extend out from the second fork stem. The key holes are oblong slits axially formed through the surface of the first fork stem, and both ends of the key extend into the oblong slits.

The suspension fork also includes a movement limiting means, which limits the amount of downward movement of the second fork stem, and absorbs shock generated when the second fork stem reaches the limit of its downward movement. The movement limiting means includes a shock absorbing member made of an elastic material and fixed at an interior end of the second fork stem, two through holes formed in the second fork stem, and a stop pin fixed to the first fork stem and extending through the through holes. The stop pin comes into contact with the shock absorbing member before the key comes into contact with the lowermost end of the oblong slits.

In another embodiment of the present invention, the load adjusting means includes a threaded bolt with a hexagonal hole formed in a central axial portion thereof, a hexagonal rod partially disposed in the hexagonal hole, and a rotary knob mounted on one end of the hexagonal rod.

In yet another embodiment of the present invention, the key includes at least two leaf springs having inclined portions. Both ends of the leaf springs extend out from the second fork stem, and the key has a width larger in an uncompressed state than in a compressed state.

According to one modification, the leaf springs further include step portions disposed between the inclined portions.

According to another modification, the key further includes a generally rectangular member disposed between the leaf springs.

According to yet another modification, the rectangular member is shorter than the leaf springs and the leaf springs further include a plurality of claw portions.

According to yet another modification, each of the leaf springs further include a projection formed in the center thereof and two claw portions, and the rectangular portion includes a hole formed in the center thereof corresponding to the projections on the leaf springs.

Other objects, features, aspects and advantages of the present invention will be apparent from the following detailed description of the present invention when taken in conjunction with the accompanying drawings, in which like reference numerals designate the same or similar parts throughout.

DESCRIPTION OF THE PREFERRED EMBODIMENTS

First Embodiment

Figure 1:
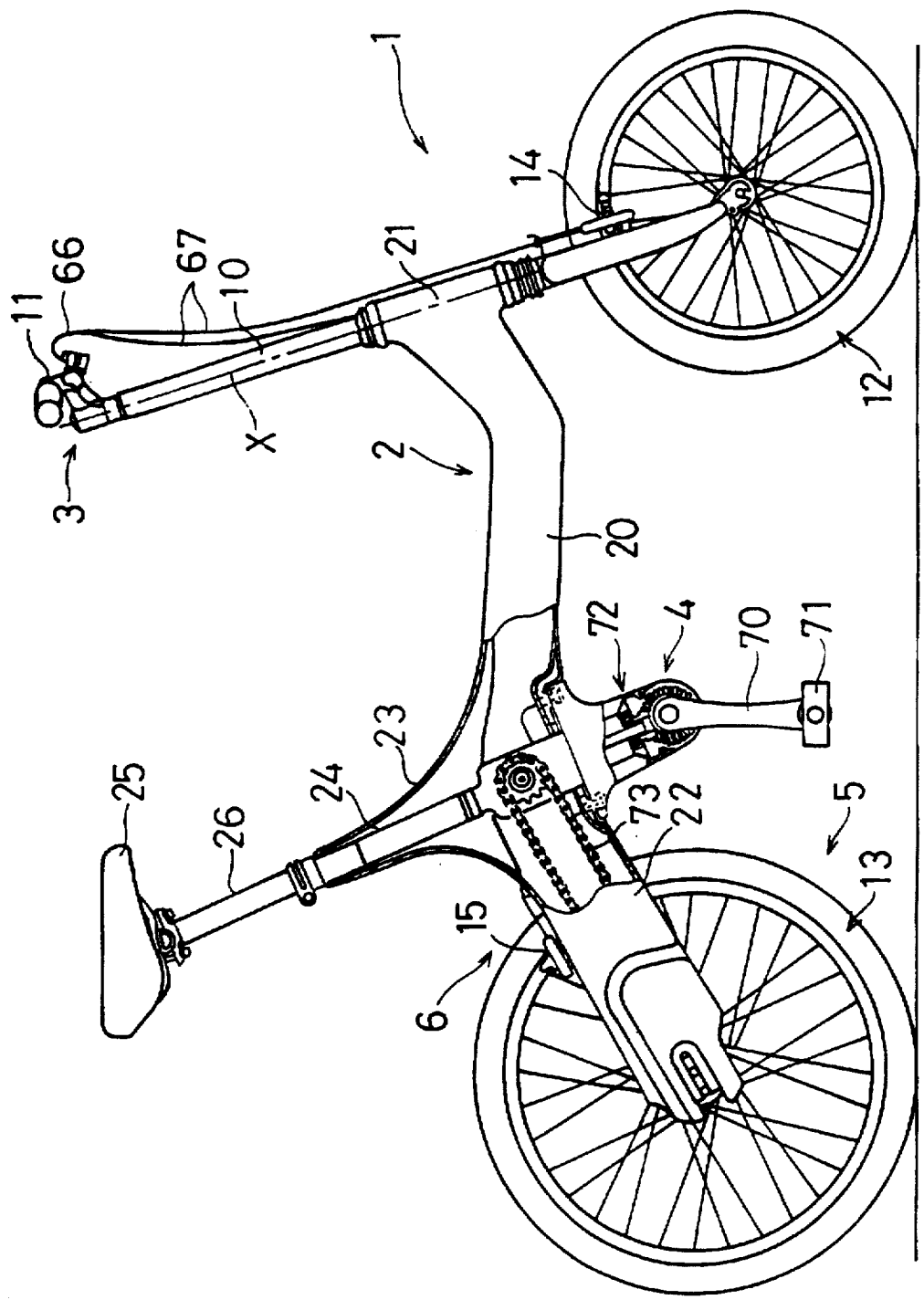
FIG. 1 is a side elevation of a bicycle according to a first embodiment of the present invention.

FIG. 1 shows a bicycle 1 having a suspension fork 10 according to one embodiment of the present invention. The bicycle 1 includes a frame 2, the suspension fork 10 supported on the frame 2, a steering portion 3 fixed on the top of the suspension fork 10, a handle 11 fixed to the steering portion 3, a drive portion 4 supported on a middle to rear portion of the frame 2, a running portion 5 which includes a front wheel 12 and a rear wheel 13 arranged on the front and rear sides of the frame 2, and a braking portion 6 which includes a front brake 14 and a rear brake 15 for braking the front wheel 12 and rear wheel 13.

The frame 2 further includes a generally horizontal main frame 20 having an hollow, oval-shaped cross section, a head portion 21, a seat stay 22 and a seat support portion 23. The front portion of the main frame 20 extends upward, with the head portion 21 fixed to the end thereof at an oblique angle. The seat stay 22 is bifurcated from the rear portion of the main frame 20 and extends downward at a oblique angle. The rear wheel 13 is mounted on the rear ends of the seat stay 22. The seat support portion 23 extends upward at an oblique angle from a rear portion of the main frame 20. A seat tube 24 is mounted in the interior of the seat support portion 23 and is slanted at an oblique angle. A seat post 26 is adjustably fitted in the seat tube 24, and includes a saddle 25 connected to the upper end thereof. The head portion 21 rotatably supports the suspension fork 10 about an axis X.

Figure 2:
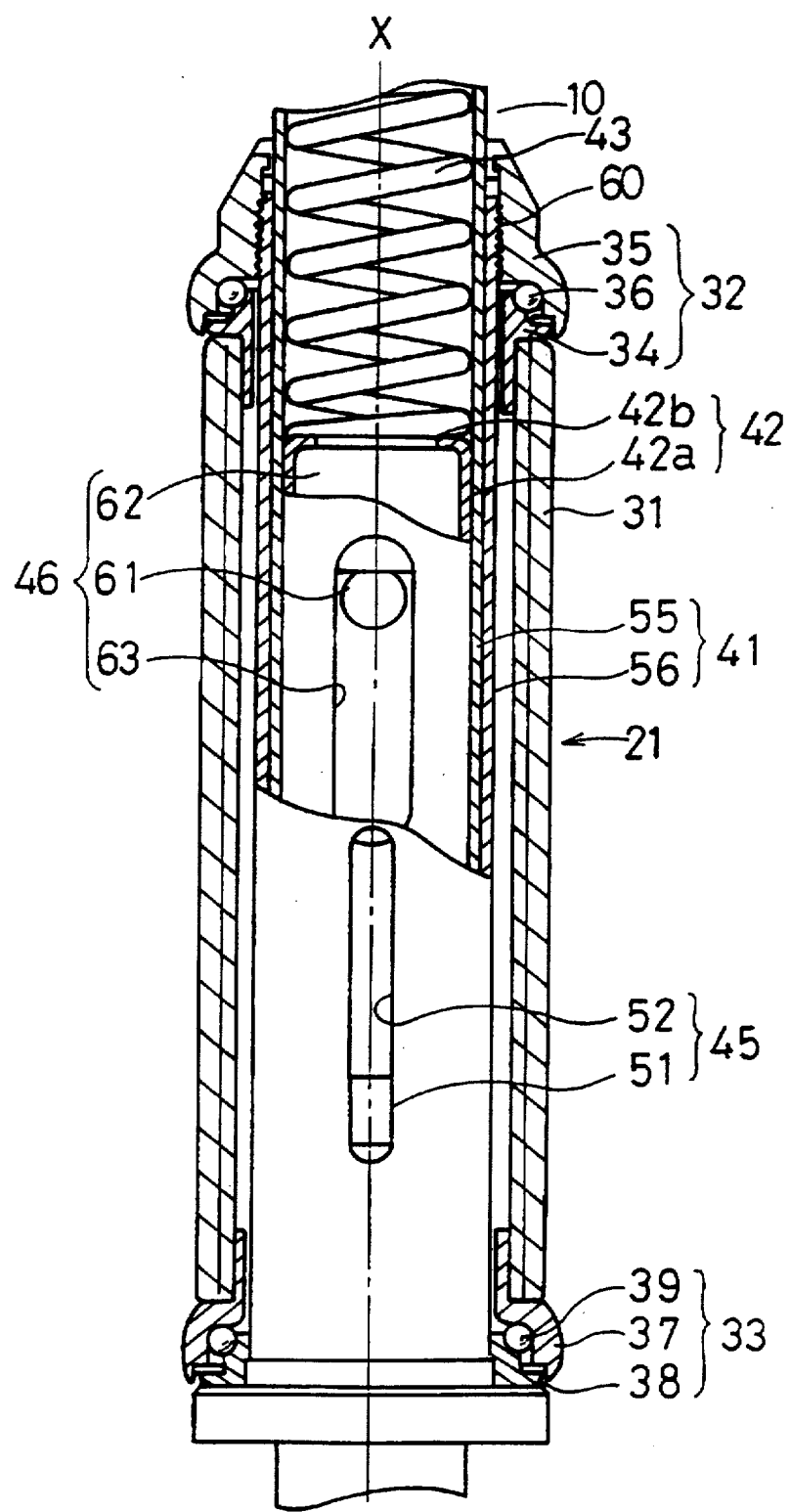
FIG. 2 is a part fragmentary, part cross-sectional view showing a head portion of the bicycle depicted in FIG. 1.

As shown in FIG. 2 on an enlarged scale, the head portion 21 includes a head pipe 31 attached to the front portion of the main frame 20, and upper and lower bearing portions 32 and 33 disposed on both ends of the head pipe which rotatably support the suspension fork 10 about the axis X. The upper bearing portion 32 has an upper cup 34 press fitted into an upper end portion of the head pipe 31, an upper ball bearing pusher 35 disposed above and opposed to the upper cup 34 and screwed onto the suspension fork 10, and ball bearings 36 interposed between the upper cup 34 and the upper ball bearing pusher 35. The lower bearing portion 33 has a lower cup 37 press fitted into a lower end portion of the head pipe 31, a lower ball bearing pusher 38 disposed below and opposed to the lower cup 37 and screwed onto the suspension fork 10, and ball bearings 39 interposed between the lower cup 37 and the lower ball pusher 38.

Figure 3:
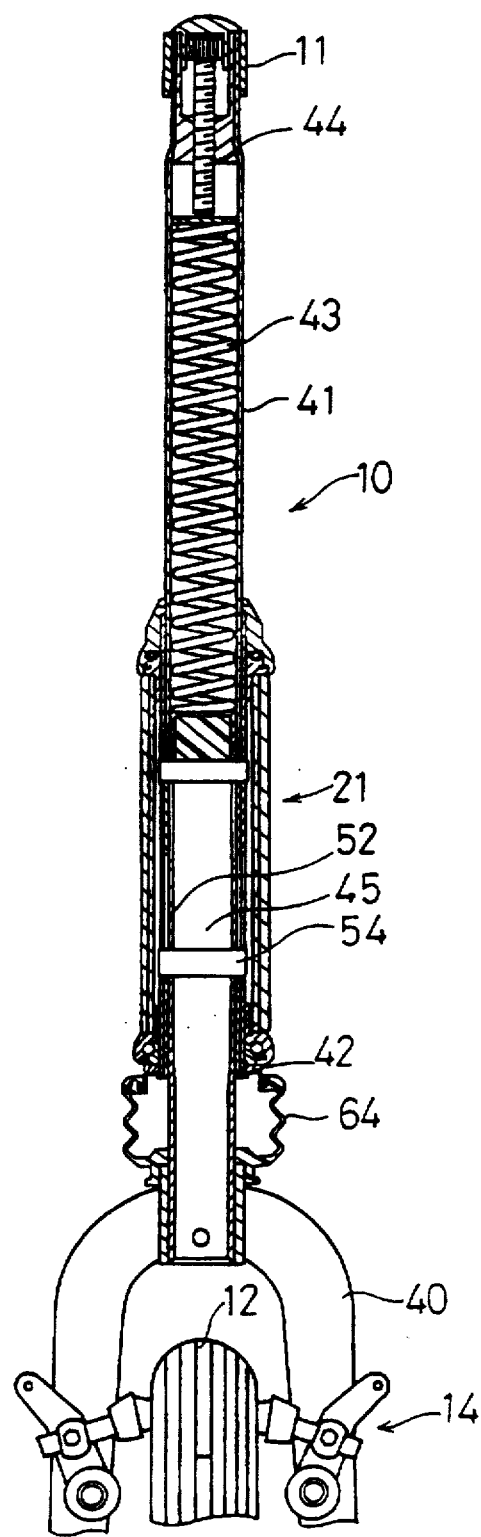
FIG. 3 is a part fragmentary, part cross-sectional view showing a suspension fork of the bicycle depicted in FIG. 1.

As shown in FIG. 3, the suspension fork 10 includes an inverted U-shaped fork portion 40, a first fork stem 41 rotatably supported on the head portion 21, a second fork stem 42 partially disposed within the first fork stem 41 and axially movable along the X axis, a coil spring 43 disposed within the first fork stem 41, a load adjustment bolt 44 for adjusting the initial load of the coil spring 43 and thereby adjust the elasticity of the suspension, a coupling portion 45 for coupling the first fork stem 41 and the second fork stem 42 to allow them to be relatively movable with respect to each other in the axial direction but unrotatable relative to each other, and a bumper 46 (see FIGS. 2 and 4) for absorbing or moderating shock received through the suspension fork 10.

The fork portion 40 supports the front wheel 12 at its lower end, and also rotatably supports a pair of cantilever front brakes 14. As shown in FIG. 1, a pair of brake levers 66 for the front and rear wheels form the braking portion 6, and are mounted on both end portions of the handle 11. Each brake lever 66 is coupled to the front or rear brake 14, 15 by a brake wire 67.

Figure 4:
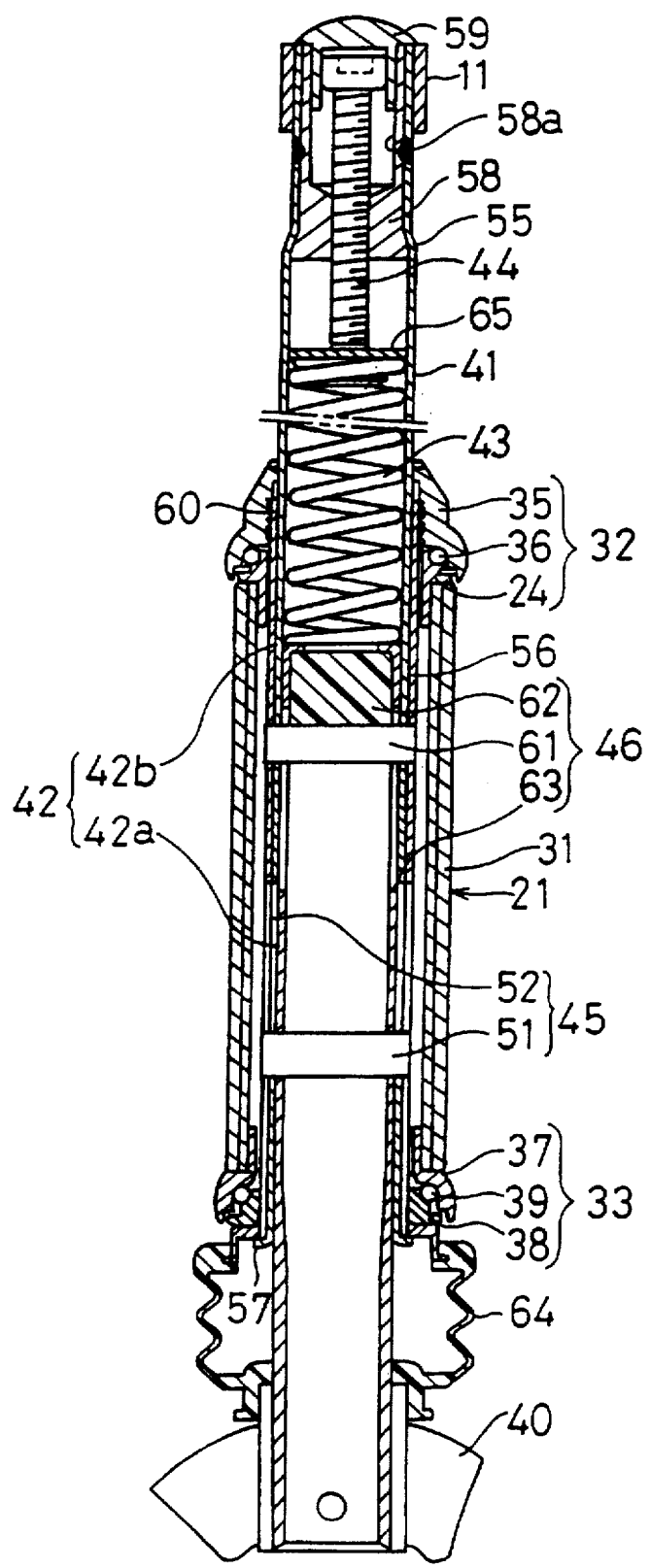
FIG. 4 is an expanded view the suspension fork depicted in FIG. 3.

As shown in FIG. 4 on a larger scale, the first fork stem 41 is fixed to the handle 11, and includes a first pipe 55 with an upper portion drawn to a diameter smaller than the first fork stem 41, and a second pipe 56 having a outer diameter of 25.4 mm, which is fitted around the outer periphery of the first pipe 55 and disposed within the head portion 21. The first pipe 55 extends from the handle 11 and projects from the lower end of the head portion 21. A flanged portion 57 is formed on the lower end of the first pipe 55 and extends from the bottom of the head portion 21. A nut portion 58 is attached to the inside wall of the upper end of the first pipe 55 and is engaged with the load adjustment bolt 44. The nut portion 58 includes a bolt receiving hole 58a which opens upward and is covered by a cap 59. Threads 60 are formed around the outer circumference of the upper end of the second pipe 56 for a length of, for example, 35 mm, and engage with the threaded portion of upper ball bearing pusher 35.

As shown in FIG. 2, an oblong slit 52 is axially formed along the lower portion of the first fork stem 41 at a length of, for example, 35 mm, and serves as a key hole for the coupling portion 45. The width of the slit 52 is slightly larger than the width of the rotation preventing key 51, which together forms the coupling portion 45. An extendable or retractable bellows boot 64 is disposed between the lower end of the first fork stem 41 and the fork portion 40 and serves to prevent the introduction of foreign matter into suspension fork 10.

The lower end of the second fork stem 42 is fixed to the upper end of the fork portion 40, and the upper end thereof extends into the interior of the first fork stem 41. As can be seen in FIG. 4, the second fork stem 42 includes a sleeve-like pipe portion 42a having walls in which the lower portion is thicker than the upper portion, and a ring-shaped spring seat 42b for covering the upper end of the pipe portion 42a. The outside diameter of the pipe portion 42a is such that it may slide along the inner circumferential surface of the first pipe portion 55. The rotation preventing key 51 extends through the outer circumferential surface of an intermediate portion of the pipe portion 42a, and is flush with the outer circumferential surface of the first fork stem 41 at both ends.

The bumper 46 includes a stop pin 61, a stop 62 and an through hole 63. The stop 62 is mounted on the inside of the upper end of the pipe portion 42a, and may be formed of urethane or other suitably elastic material. As shown in FIG. 2, an oblong through hole 63 is axially formed in the upper circumferential surface of the pipe portion 42a, and the stop pin 61 passes therethrough. The stop pin 61 is disposed so as to come into contact with the stop 62 just before the point in which the rotation preventing key 51 reaches the lower end of the slit 52.

The coil spring 43 is used to bias the first stem 41 and the second stem 42 away from each other. As shown in FIG. 4, the coil spring 43 is disposed in a compressed condition between the spring seat 42b at the upper end of the second fork stem 42 and a spring seat 65 disposed at the lower end of the load adjustment bolt 44. The initial load of the coil spring 43 may be adjusted within a predetermined range as desired by means of the load adjustment bolt 44.

Figure 5:
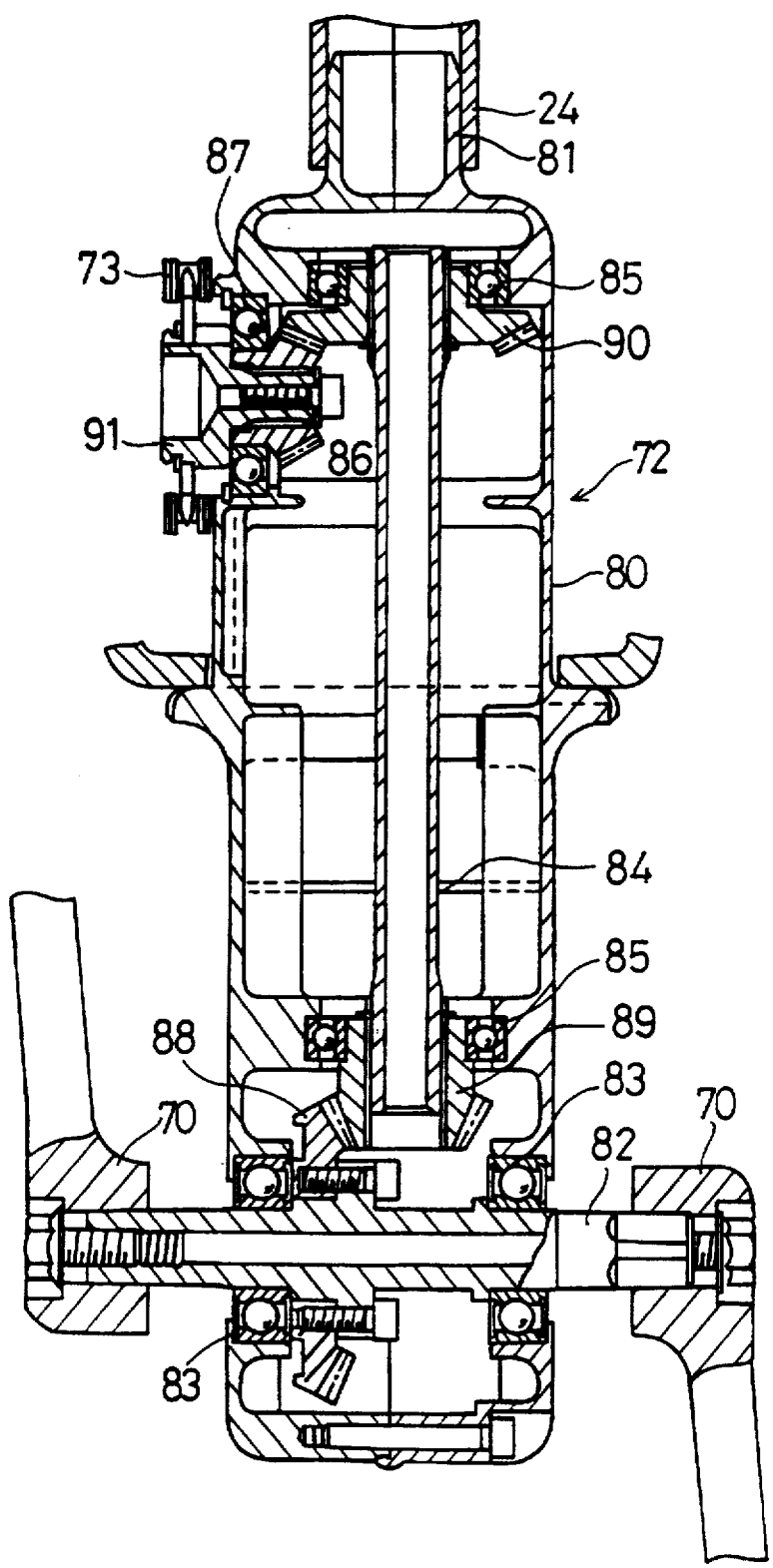
FIG. 5 is a part fragmentary, cross-sectional view showing a speed increasing portion of the bicycle depicted in FIG. 1.

As shown in FIG. 5, the driving portion 4 includes a pair of right and left cranks 70, pedals 71 (see FIG. 1) rotatably mounted to the ends of the cranks 70, a speed increasing portion 72, and a chain 73 for transmitting the drive force to the rear wheel 13.

The speed increasing portion 72 is mounted on a bottom surface of a rear portion of the main frame 20, with the upper portion thereof being inclined rearward. As shown in detail in FIG. 5, the speed increasing portion 72 includes a gear case 80 mounted on the main frame 20. The gear case 80 is a box-like member, and includes a mounting projection 81 formed on a upper end face thereof. The mounting projection 81 is inserted into the lower end of the seat tube 24.

A crank shaft 82 is rotatably supported by ball bearings 83 in the lower portion of the gear case 80. A hollow intermediate shaft 84 is rotatably supported in the central portion of the gear case 80 by ball bearings 85. An output bevel gear 86 is rotatably supported by ball bearings 87 in the gear case 80, and an input bevel gear 88 is mounted on the inside of the ball bearings 83 of the crank shaft 82. A first intermediate bevel gear 89 is mounted at the lower end of the intermediate shaft 84 and engages with the input bevel gear 88. A tooth number ratio of the input bevel gear 88 and the first intermediate bevel gear 89 is for, example, 2:1. A second intermediate bevel gear 90 is mounted at the top end of the intermediate shaft 84 and engages with the output bevel gear 86. The gear number ratio between the second bevel gear 90 and the output bevel gear 87 is for example, 2:1. As a result, the speed increasing portion 72 accelerates the rotation of the crank 70 by four times. A sprocket 91 is mounted on the output bevel gear 87 and engages with the chain 73.

The operation of the suspension fork 10 according to the above-described embodiment will now be described.

When a upward shock is applied to the front wheel 12 of the bicycle 1, the force of the shock is transmitted to the second fork stem 42 through the fork portion 40. The second fork stem 42, guided by the rotation preventing key 51 and the slit 52, is moved upward within the first fork stem 41 and compresses the coil spring 43. The coil spring 43 then biases the second fork stem 42 downward again.

When the second fork stem is biased downward, the stop pin 61 comes into contact with the stop 62, and absorbs shock, before the rotation preventing key 51 reaches the lower end of the slit 52. As a result, the further downward movement of the second fork stem 42 is limited, and the rotation preventing key 51 may only strike the lower end of the slit 52 lightly, thereby reducing the amount of noise generated during operation.

When the bicycle rider wants to adjust the elasticity of the suspension fork 10, the cap 59 is removed and the load adjustment bolt 44 is rotated by a tool such as an Allen wrench. For example, in the case where the elasticity is adjusted in conformity with the rider's weight, the bolt is rotated counterclockwise when the rider is light, whereas when the rider is heavy, the bolt is rotated clockwise so that the suspension fork 10 is slightly more compressed.

Because the coupling portion 45 of the suspension fork 10 is composed of only the rotation preventing key 51 and the slit 52, the cost of production for the coupling portion 45 and the suspension fork 10 may be reduced. Thus, it is possible to mount the suspension fork 10 on a less expensive regular bicycle, rather than on an more expensive mountain bicycle. In addition, it is possible to make the outer diameter of the first fork stem 41 the same dimension (25.4 mm) as the diameter of the standard rigid fork used on most bicycles. This makes it possible for the suspension fork 10 to be interchangeable with standard rigid forks having a diameter of 25.4 mm.

The suspension fork according to the present invention may be mounted on any bicycle if the rigid fork conforms to Japanese Industrial Standard (JIS) D9402-1990. In addition, the structure of the movement limiting means is not limited to the stop 62 and the stop pin 61. It is apparent that any structure may be used if the movement of the second fork stem 42 is limited while any shock is absorbed at the upper end of the suspension fork during its elongation.

Because the drive portion 4 is disposed inside the frame 2, the aesthetic appearance of the bicycle is excellent. In addition, there is little possibility that the rider's clothes could be soiled or entangled in the drive portion 4, even without the provision of a chain cover or the like. And since acceleration is accomplished by means of bevel gears, it is possible to make the mechanism of the drive portion 4 compact.

Second Embodiment

In the suspension fork 10 according to the first embodiment, it is necessary to use a special tool such as an Allen wrench for rotating the load adjustment bolt 44. In order to adjust the elasticity of the suspension while on the road, the cyclist must always bring the tool with him or her.

The second embodiment of the present invention allows the rider to adjust the elasticity of the suspension without using any tools. In this embodiment, the same reference numerals are used to indicate like components and any unnecessary explanation will therefore be omitted.

Figure 6:
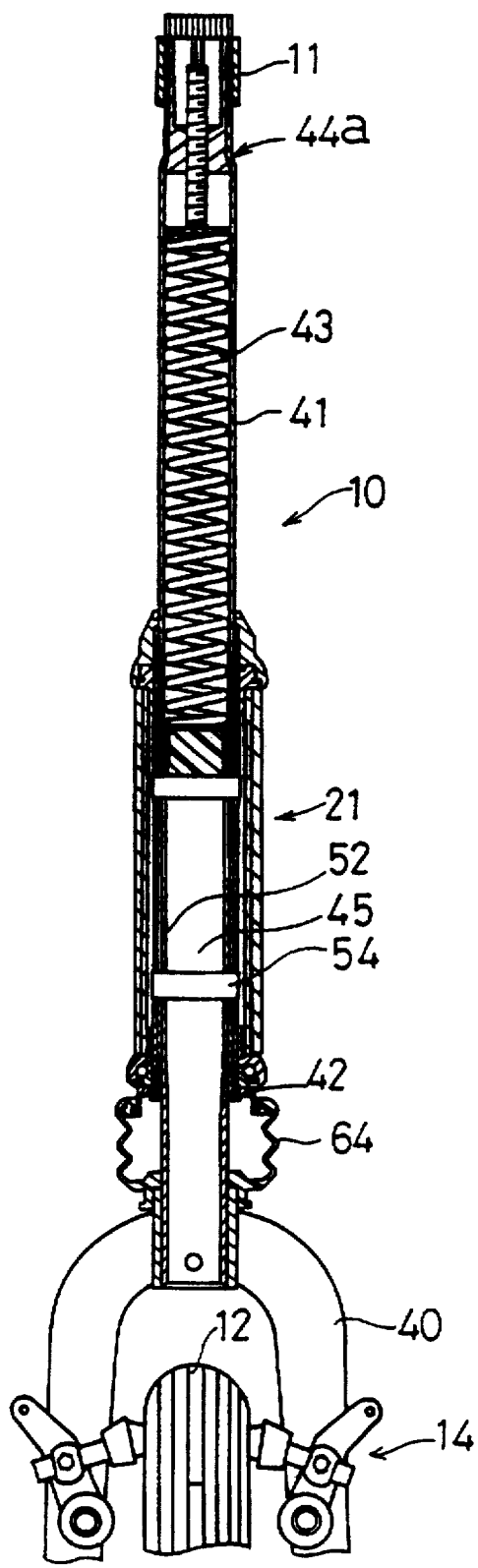
FIG. 6 is a part fragmentary, part cross-sectional view showing a suspension fork according to a second embodiment of the present invention.
Figure 7:
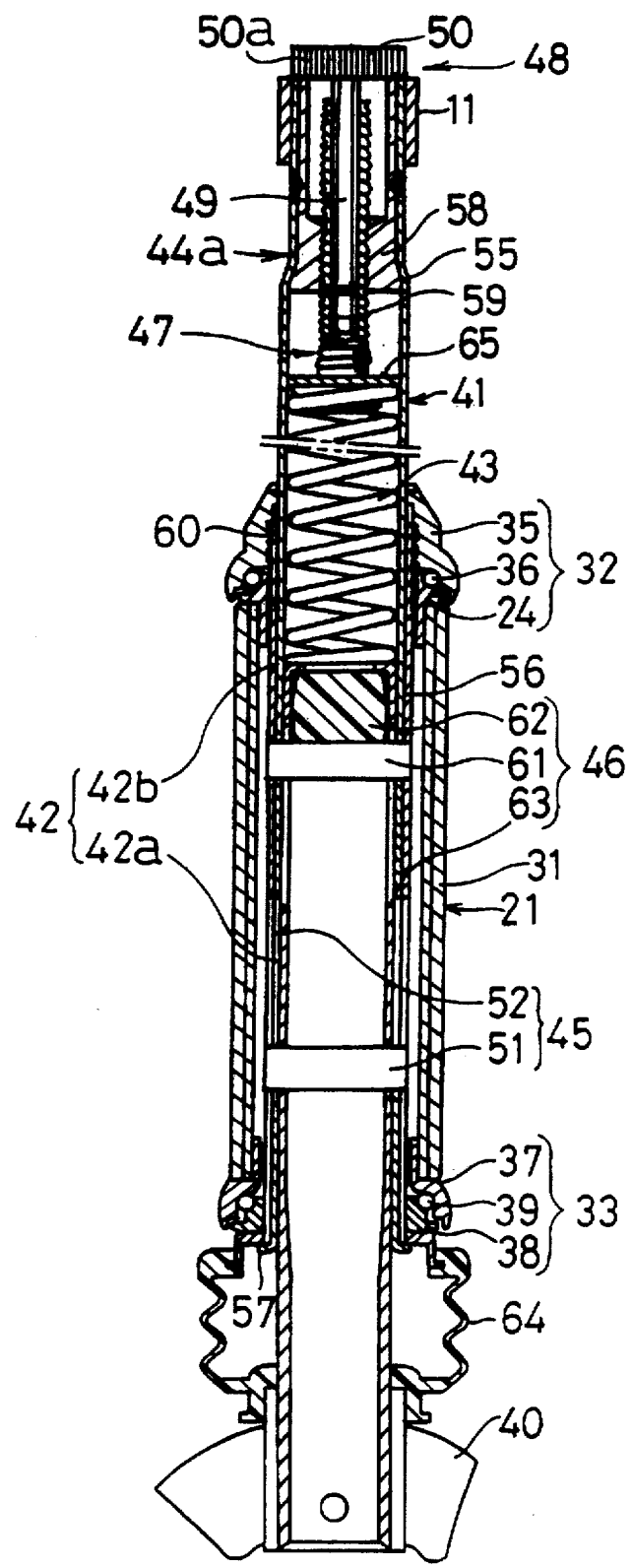
FIG. 7 is an expanded view the suspension fork depicted in FIG. 6.

As shown in FIGS. 6 and 7, a suspension fork according to a second embodiment of the present invention is similar to that of the first embodiment except for a load adjustment portion 44a, which adjusts the elasticity of the suspension by adjusting an initial load of the coil spring 43.

The load adjustment portion 44a includes the nut portion 58, an adjustment screw 47 engaged with the nut portion 58, and a rotary portion 48 connected to the adjustment screw 47. A hexagonally shaped hole 59 is formed through the axial center of the adjustment screw 47. The rotary portion 48 includes a hexagonal rod 49 which is engaged with the hexagonal hole 59, and a rotary knob 50 mounted at the tip of the hexagonal rod 49. The rotary knob 50 is disc-shaped, and includes serrated portions 50a around its outer circumferential surface for preventing slippage.

With a suspension fork 10 constructed in this manner, since it is possible to advance and retract the adjustment screw 47 in the axial direction by rotating the rotary knob 50 by hand, it is possible to readily adjust the elasticity of the suspension during cycling without the use of a separate tool.

Third Embodiment

In the two foregoing embodiments, the coupling portion 45 includes the rotation preventing key 51 and the slit 52 engaged with the key 51, and causes the first fork stem 41 and the second fork stem 42 to be movable relative to each other in the axial direction but not rotatable relative to each other. In this case, the cost for the coupling portion 45 and the overall suspension is low.

However, when the coupling portion 45 is constructed as described above, in order to make the first fork stem 41 and the second fork stem 42 smoothly movable relative to each other in the axial direction, it is necessary to control the dimensions of the rotation preventing key 51 and the slit 52 with high precision. In addition, because it is necessary to make the width of the slit 52 larger than the width of the rotation preventing key 51, a rattle may be generated by the coupling portion 45. In this third embodiment, the rotation preventing key 51 includes a leaf spring in order to solve this problem. The other portions of the suspension fork 10 are the same as that of the foregoing embodiments, therefore any unnecessary explanation will be omitted.

Figure 8:
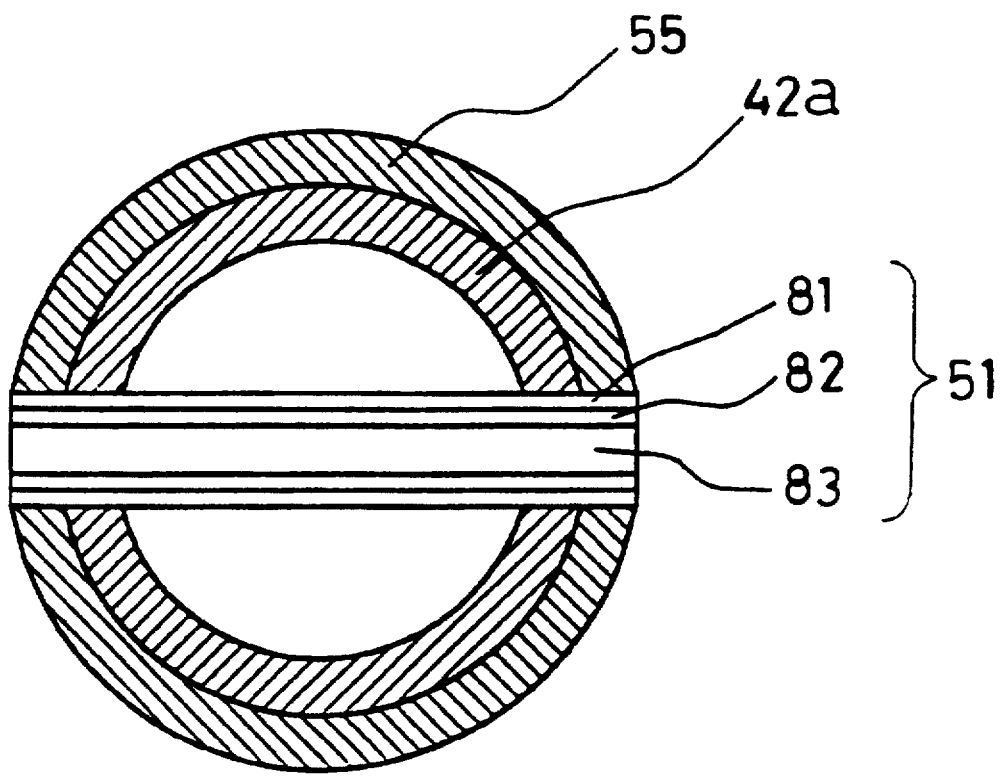
FIG. 8 is a cross-sectional view of a coupling portion for a first fork stem and a second fork stem, according to a third embodiment of the present invention.
Figure 9:
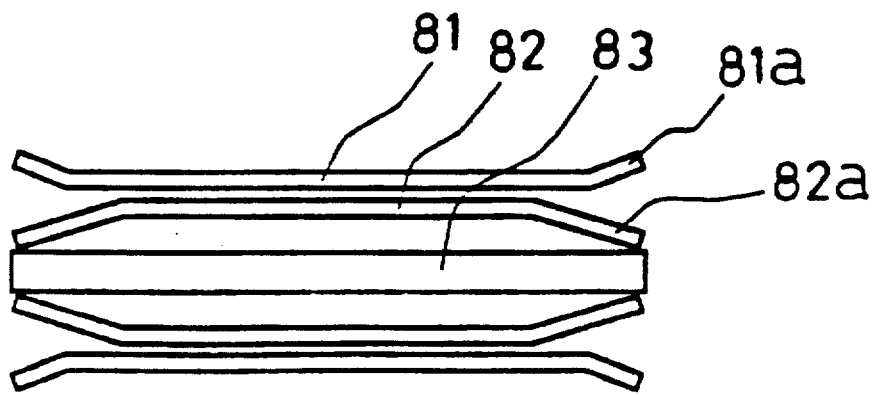
FIG. 9 is a cross-sectional view of an uncompressed rotation prevention key of the coupling portion depicted in FIG. 8.

As shown in FIGS. 8 and 9, the rotation preventing key 51 is composed of two pairs of leaf springs 81 and 82 and a planar member 83. The planar member 83 is clamped by a pair of leaf springs 82, and the other pair of leaf springs 81 are arranged to clamp the planar member 83 and the pair of leaf springs 82. The leaf springs 81 include inclined portions 81a at both ends thereof, and the leaf springs 82 include inclined portions 82a at both ends thereof.

As shown in FIG. 2, the slit 52 which serves as a key hole for the coupling portion 45 is formed in the axial lower portion of the first fork stem 41. In this embodiment, the width of the slit 52 is slightly narrower than the width of the rotation preventing key 51 in its uncompressed state, but is slightly wider than the width of the rotation preventing key 51 in its compressed state.

Any gap which may exist between the width of the slit 52 and the width of the rotation preventing key 51 in the compressed state will be filled with the inclined portions 81a of the leaf springs 81. In addition, any gap between the hole in the pipe portion 42a in which the rotation preventing key 51 passes and the key 51 itself may be substantially eliminated. Thus, it is unnecessary to control the width of the slit 52 and the rotation preventing key 51 with high precision, thereby reducing the cost.

In addition, since the rotation preventing key 51 and the slit 52 are engaged with each other by means of the leaf springs 81, resistance is generated during the sliding operation of the suspension fork 10. It is therefore possible to adjust the amount sliding resistance by selecting the characteristics of the leaf springs, thereby allowing the suspension fork 10 to operate more smoothly.

When the handle 11 mounted on the handle post 3 is turned by the rider, the first fork stem 41 and the second fork stem 42 are rotated together by means of the coupling portion 45. Here, because the rotation preventing key 51 and the slit 52 are engaged with each other by means of the leaf springs 81, it is possible to fill any gap between the key 51 and the slit 52 to thereby reduce or eliminate any rattle or displacement when the handle 11 is operated.

Figure 10:
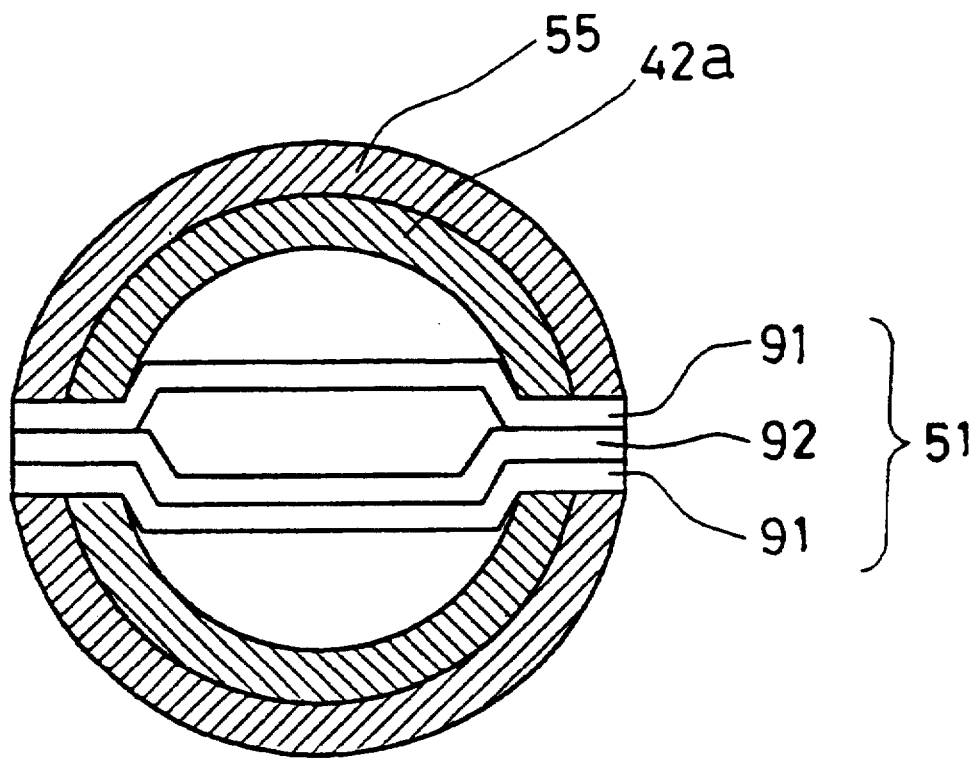
FIG. 10 is a cross-sectional view of a coupling portion for a first fork stem and a second fork stem, according to a modification to the third embodiment of the present invention.
Figure 11:
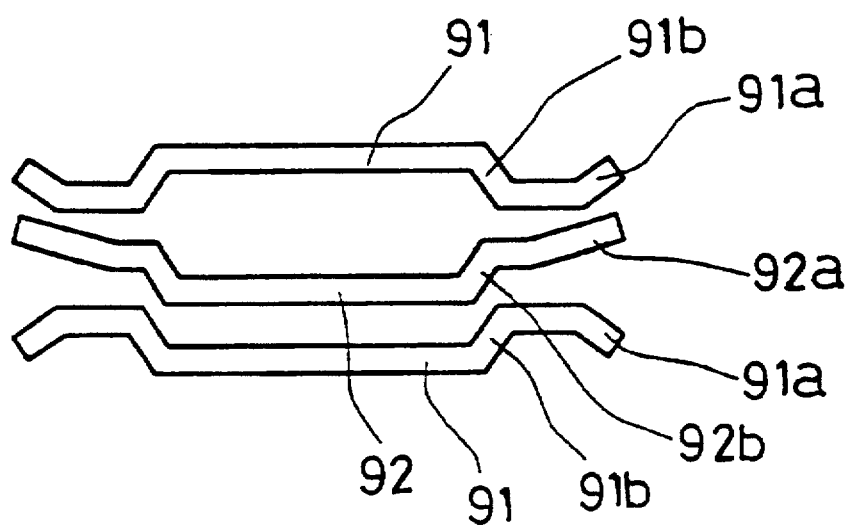
FIG. 11 is a cross-sectional view of an uncompressed rotation prevention key of the coupling portion depicted in FIG. 10.

The third embodiment of the present invention may be modified in a number of ways. For example, it is possible to use a rotation preventing key 51 that is composed of a pair of leaf springs 91 and 92 as shown in FIGS. 10 and 11.

In this modification, leaf springs 91 include two inclined portions 91a at both ends thereof, and a leaf spring 92 includes inclined portions 92a. In addition, leaf springs 91 and 92 include stepped portions 91b and 92b respectively, which serves to retain the rotation preventing key 51 in the pipe portion 42a.

Figure 12:
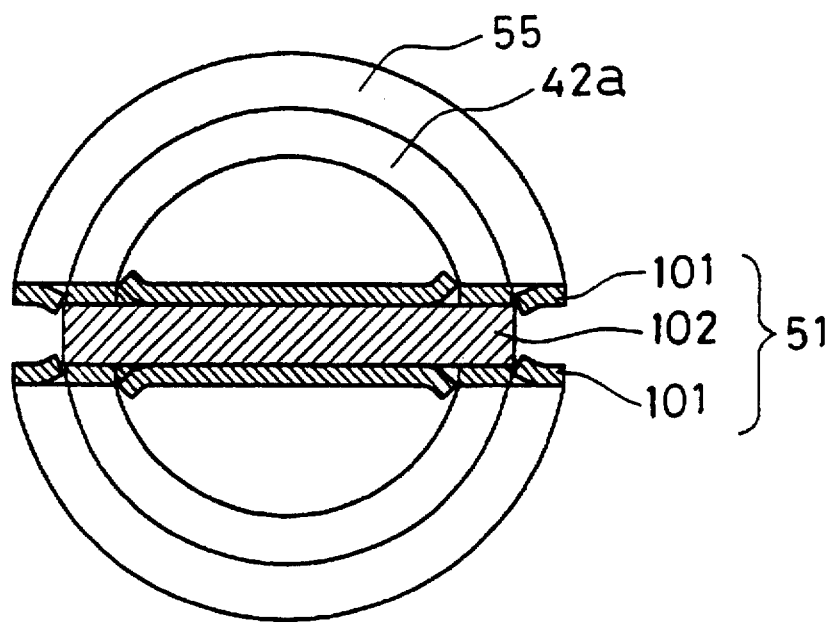
FIG. 12 is a cross-sectional view of a coupling portion for a first fork stem and a second fork stem, according to another modification to the third embodiment of the present invention.
Figure 13:
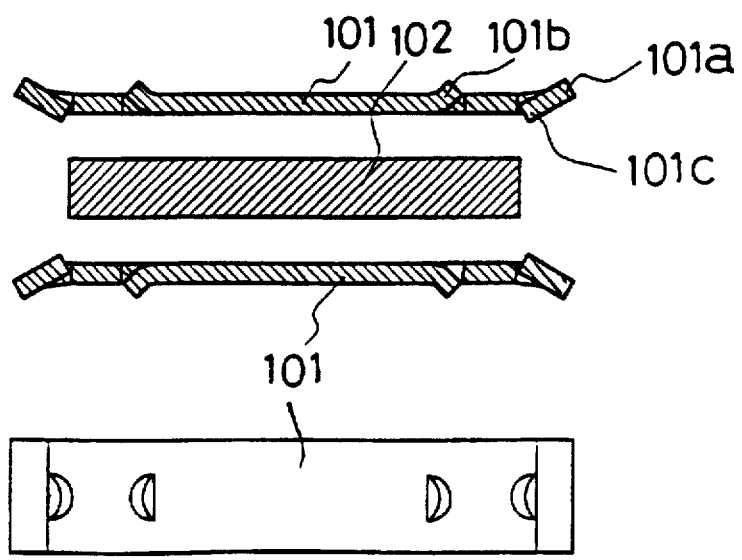
FIG. 13 is a cross-sectional and plan view of an rotation prevention key of the coupling portion depicted in FIG. 12.

According to another modification, it is possible to use a rotation preventing key 51 that is composed of two leaf springs and a planar member. As shown in FIGS. 12 and 13, the rotation preventing key 51 includes two leaf springs 101, and a planar member 102 which is shorter than the two leaf springs 101. The two leaf springs 101 include inclined portions 101a formed at both ends thereof, and claw portions 101b and 101c formed along the length thereof. The claws 101c help prevent the planar member 102 from being dislocated with respect to the leaf springs 101, and the claws 101b help prevent the key 51 from being dislocated with respect to the pipe portion 42a.

Figure 14:
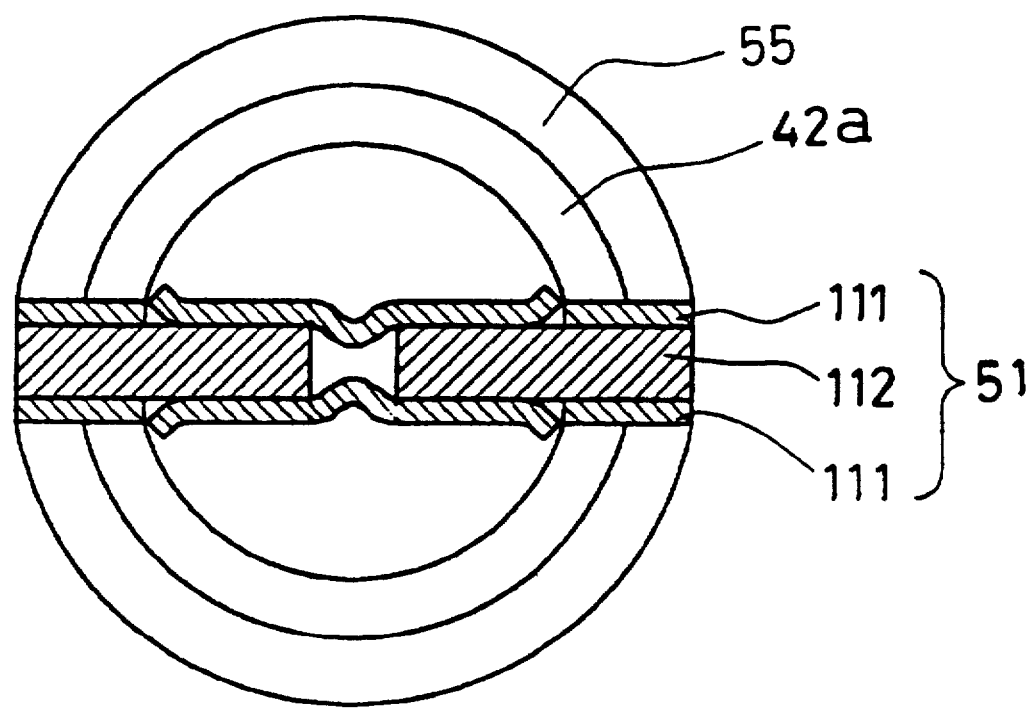
FIG. 14 is a cross-sectional view of a coupling portion for a first fork stem and a second fork stem, according to yet another modification to the third embodiment of the present invention.
Figure 15:
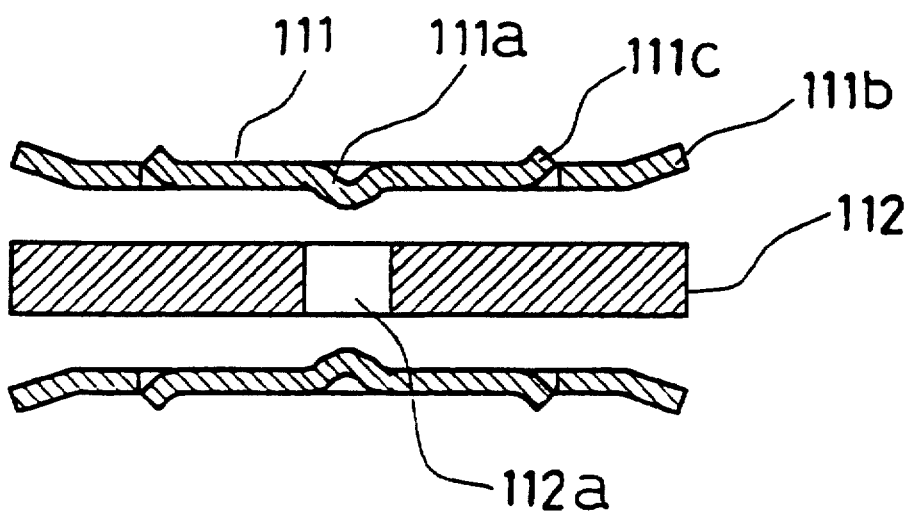
FIG. 15 is a cross-sectional view of an rotation prevention key of the coupling portion depicted in FIG. 14.

According to yet another modification, it is possible to use a rotation preventing key 51 that is composed of a pair of leaf springs 111 and a planar member 112 as shown in FIGS. 14 and 15. The leaf springs 111 include projections 111a formed in the center thereof, inclined portions 111b formed on the ends thereof, and claws 111c formed along the length thereof.

The planar member 112 includes a hole 112a formed in the middle thereof, which corresponds to the projection in the leaf springs 111. Engaging the projections 111a with the hole 112a helps to prevent the planar member 112 from being dislocated with respect to the leaf springs 111.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

We claim:

1. A suspension fork rotatably supported on a head portion of a bicycle, comprising:

a fork portion for supporting a front wheel;

a first fork stem rotatably supported by said head portion;

a second fork stem extending from said fork portion into an interior of said first fork stem;

a biasing means for biasing said first fork stem and said second fork stem away from each other;

a load adjustment means for adjusting an initial load of said biasing means;

a coupling means which includes a key and two key holes with which said key engages, said coupling means coupling said first fork stem and said second fork stem together, and configured to allow said first fork stem and said second fork stem to be axially movable relative to each other but unrotatable relative to each other;

a shock absorbing member made of an elastic material and fixed at an interior end of said second fork stem, two through holes formed in said second fork stem, and a stop pin fixed to said first fork stem and extending through said through holes, said shock absorbing member limiting an amount of downward movement of said second fork stem, and absorbing shock generated when said second fork stem reaches said limit of the downward movement.

2. The suspension fork according to claim 1, wherein said biasing means is disposed within said first fork stem, a first end of said biasing means is in contact with said load adjustment means, and a second end of said biasing means is in contact with said second fork stem.

3. The suspension fork according to claim 1, wherein said biasing means comprises a coil spring disposed within the interior of said first fork stem.

4. The suspension fork according to claim 1, wherein said key extends through said second fork stem, both ends of said key project out from a circumferential surface of said second fork stem, said key holes comprise oblong slits axially formed through a circumferential surface of said first fork stem, and said both ends of said key extend into said oblong slits.

5. The suspension fork according to claim 1, wherein said stop pin comes into contact with said shock absorbing member before said key comes into contact with a lowermost end of said oblong slits.

6. The suspension fork according to claim 1, wherein said load adjusting means moves axially in response to rotation thereof.

7. The suspension fork according to claim 6, wherein said load adjusting means comprises a threaded bolt with a hexagonal hole formed in a central axial portion thereof, a hexagonal rod partially disposed in said hexagonal hole, and a rotary knob mounted on one end of said hexagonal rod.

8. The suspension fork according to claim 4, wherein said key includes at least two leaf springs having inclined portions, both ends of said leaf springs extend out from said circumferential surface of said second fork stem, and said key has a width in an uncompressed state larger than the width of said oblong slits.

9. The suspension fork according to claim 8, wherein said leaf springs further include step portions disposed between said inclined portions.

10. The suspension fork according to claim 8, wherein said key further includes a generally rectangular member disposed between said leaf springs.

11. The suspension fork according to claim 10, wherein said rectangular member is shorter than said leaf springs, and said leaf springs further include a plurality of claw portions.

12. The suspension fork according to claim 10, wherein each of said leaf springs further include a projection formed in a center thereof and two claw portions, and said rectangular portion includes a hole formed in the center thereof corresponding to said projections on said leaf springs.

13. A suspension fork rotatably supported on a head portion of a bicycle, comprising:

a fork portion for supporting a front wheel;

a first fork stem rotatably supported by said head portion;

a second fork stem extending from said fork portion into an interior of said first fork stem;

a biasing means for biasing said first fork stem and said second fork stem away from each other;

a load adjustment means for adjusting an initial load of said biasing means, said said load adjusting means comprising a threaded bolt with a hexagonal hole formed in a central axial portion thereof, a hexagonal rod partially disposed in said hexagonal hole, and a rotary knob mounted on one end of said hexagonal rod; and a coupling means which includes a key and two key holes with which said key engages, said coupling means coupling said first fork stem and said second fork stem together, and configured to allow said first fork stem and said second fork stem to be axially movable relative to each other but unrotatable relative to each other.

14. The suspension fork according to claim 13, wherein said biasing means is disposed within said first fork stem, a first end of said biasing means is in contact with said load adjustment means, and a second end of said biasing means is in contact with said second fork stem.

15. The suspension fork according to claim 13, wherein said biasing means comprises a coil spring disposed within the interior of said first fork stem.

16. The suspension fork according to claim 13, wherein said key extends through said second fork stem, both ends of said key project out from a circumferential surface of said second fork stem, said key holes comprise oblong slits axially formed through a circumferential surface of said first fork stem, and said both ends of said key extend into said oblong slits.

17. The suspension fork according to claim 13, further comprising a movement limiting means, said movement limiting means limiting an amount of downward movement of said second fork stem, and absorbing shock generated when said second fork stem reaches said limit of said downward movement.

18. The suspension fork according to claim 17, wherein said movement limiting means comprises a shock absorbing member made of an elastic material and fixed at an interior end of said second fork stem, two through holes formed in said second fork stem, and a stop pin fixed to said first fork stem and extending through said through holes.

19. The suspension fork according to claim 18, wherein said stop pin comes into contact with said shock absorbing member before said key comes into contact with a lowermost end of said oblong slits.

20. The suspension fork according to claim 16, wherein said key includes at least two leaf springs having inclined portions, both ends of said leaf springs extend out from said circumferential surface of said second fork stem, and said key has a width in an uncompressed state larger than the width of said oblong slits.

21. The suspension fork according to claim 20, wherein said leaf springs further include step portions disposed between said inclined portions.

22. The suspension fork according to claim 20, wherein said key further includes a generally rectangular member disposed between said leaf springs.

23. The suspension fork according to claim 22, wherein said rectangular member is shorter than said leaf springs, and said leaf springs further include a plurality of claw portions.

24. The suspension fork according to claim 22, wherein each of said leaf springs further include a projection formed in a center thereof and two claw portions, and said rectangular portion includes a hole formed in the center thereof corresponding to said projections on said leaf springs.

25. A suspension fork rotatably supported on a head portion of a bicycle, comprising:

a fork portion for supporting a front wheel;

a first fork stem rotatably supported by said head portion;

a second fork stem extending from said fork portion into an interior of said first fork stem, a biasing means for biasing said first fork stem and said second fork stem away from each other;

a load adjustment means for adjusting an initial load of said biasing means; and a coupling means which includes a key and two key holes with which said key engages, said coupling means coupling said first fork stem and said second fork stem together, and configured to allow said first fork stem and said second fork stem to be axially movable relative to each other but unrotatable relative to each other, said key extends through said second fork stem, both ends of said key project out from a circumferential surface of said second fork stem, said key holes comprise oblong slits axially formed through a circumferential surface of said first fork stem, and said both ends of said key extend into said oblong slits, and wherein said key includes at least two leaf springs having inclined portions, both ends of said leaf springs extend out from said circumferential surface of said second fork stem, and said key has a width in an uncompressed state larger than the width of said oblong slits.

26. The suspension fork according to claim 25, wherein said biasing means is disposed within said first fork stem, a first end of said biasing means is in contact with said load adjustment means, and a second end of said biasing means is in contact with said second fork stem.

27. The suspension fork according to claim 25, wherein said biasing means comprises a coil spring disposed within the interior of said first fork stem.

28. The suspension fork according to claim 25, further comprising a movement limiting means, said movement limiting means limiting an amount of downward movement of said second fork stem, and absorbing shock generated when said second fork stem reaches said limit of said downward movement.

29. The suspension fork according to claim 28, wherein said movement limiting means comprises a shock absorbing member made of an elastic material and fixed at an interior end of said second fork stem, two through holes formed in said second fork stem, and a stop pin fixed to said first fork stem and extending through said through holes.

30. The suspension fork according to claim 29, wherein said stop pin comes into contact with said shock absorbing member before said key comes into contact with a lowermost end of said oblong slits.

31. The suspension fork according to claim 25, wherein said load adjusting means moves axially in response to rotation thereof.

32. The suspension fork according to claim 31, wherein said load adjusting means comprises a threaded bolt with a hexagonal hole formed in a central axial portion thereof, a hexagonal rod partially disposed in said hexagonal hole, and a rotary knob mounted on one end of said hexagonal rod.

33. The suspension fork according to claim 25, wherein said leaf springs further include step portions disposed between said inclined portions.

34. The suspension fork according to claim 25, wherein said key further includes a generally rectangular member disposed between said leaf springs.

35. The suspension fork according to claim 34, wherein said rectangular member is shorter than said leaf springs, and said leaf springs further include a plurality of claw portions.

36. The suspension fork according to claim 34, wherein each of said leaf springs further include a projection formed in a center thereof and two claw portions, and said rectangular portion includes a hole formed in the center thereof corresponding to said projections on said leaf springs.

* * * * *